United States Patent [19]
Weber

[11] Patent Number: 4,923,674
[45] Date of Patent: May 8, 1990

[54] METHOD OF PRODUCING POWDER FORGED COMPONENTS

[75] Inventor: Manfred Weber, Witten, Fed. Rep. of Germany

[73] Assignee: Sintermetallwerk Krebsöge GmbH, Radevormwald, Fed. Rep. of Germany

[21] Appl. No.: 315,578

[22] Filed: Feb. 27, 1989

[30] Foreign Application Priority Data

Feb. 27, 1988 [DE] Fed. Rep. of Germany ....... 3806236
Jan. 14, 1989 [DE] Fed. Rep. of Germany ....... 3901019

[51] Int. Cl.$^5$ .............................................. B22F 3/26
[52] U.S. Cl. ......................................... 419/27; 419/28
[58] Field of Search ..................................... 419/27, 28

[56] References Cited

U.S. PATENT DOCUMENTS

| | | | |
|---|---|---|---|
| Re. 32,117 | 4/1986 | Weaver | 419/42 |
| 3,864,809 | 2/1975 | Donachie | 29/420.5 |
| 3,889,350 | 6/1975 | Mocarski | 29/420.5 |
| 4,049,429 | 9/1978 | Donachie | 75/246 |
| 4,069,044 | 1/1978 | Mocarski et al. | 75/243 |
| 4,094,053 | 6/1978 | Weaver | 29/420 |
| 4,569,109 | 2/1986 | Fetouh | 29/156.5A |
| 4,693,139 | 9/1987 | Mukai et al. | 79/579E |
| 4,838,936 | 6/1989 | Akechi | 75/249 |

FOREIGN PATENT DOCUMENTS

| | | |
|---|---|---|
| 167,320 | 1/1986 | European Pat. Office . |
| 304,162 | 2/1989 | European Pat. Office . |
| 3,724,498 | 2/1989 | Fed. Rep. of Germany . |
| 154,505 | 12/1980 | Japan . |
| 141,301 | 8/1983 | Japan . |

OTHER PUBLICATIONS

Tsumuti et al, "Application of Powder Forging to Automotive Parts", MPR Nov. 1984, pp. 629–637.

Primary Examiner—Stephen J. Lechert, Jr.
Attorney, Agent, or Firm—Spencer & Frank

[57] ABSTRACT

A method of producing powder forged components produces parts which precisely fit together, the method including the steps of: forming a one-piece preform by pressing from powder; forming at least one tear notch in the preform at a selected location; sintering the preform; providing a protective layer on each tear notch; forging the preform into a component, including closing each tear notch during the forging to form a corresponding slit; cooling the component; and separating the component at the corresponding selected location into a plurality of individual parts by breaking.

28 Claims, 3 Drawing Sheets

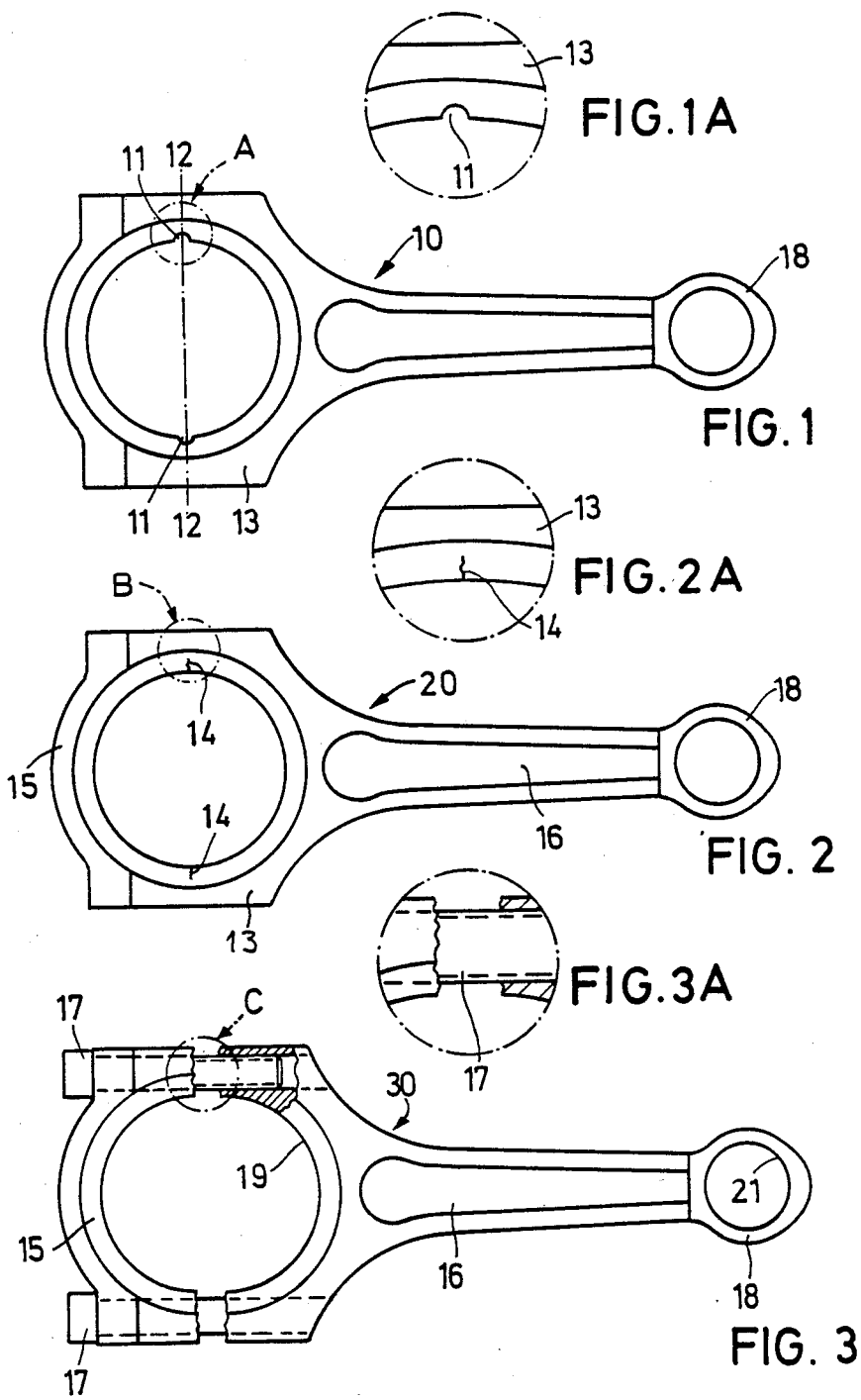

METHOD OF PRODUCING POWDER FORGED COMPONENTS

BACKGROUND OF THE INVENTION

The invention relates to a method of producing powder forged metal components which during subsequent processing are separated into at least two individual parts, with each component being pressed of powder as a one-piece preform to a final separated form, being sintered, forged, cooled and then separated into individual parts.

Such a method is employed, for example, if an article is to be produced which is composed of at least two associated individual parts. In particular, these may be individual parts which must fit together precisely. Such a case exists, for example, for a connecting rod having a divided connecting rod head. Such a connecting rod includes a bearing cap portion and a main rod portion, with these two individual parts being connected together by means of connecting rod screws.

A method of the above-mentioned type is known in which the preform is pressed of powder to excess dimensions (Chiaki Tsumuti and Ichiro Nagare, "Application of Powder Forging To Automotive Parts", FIGS. 8 and 12, in *Metal Powder Report,* Volume 39, No. 11, published November, 1984, by MPR Publishing Services, Ltd, Shrewsbury, Great Britain). The region of a future separation region or plane between two adjacent individual parts is over-dimensioned. After sintering, forging and cooling, the component is separated into a plurality individual parts. This is done by mechanical working in that the individual parts are separated from one another by sawing at the location of a separation region or plane, with each part having a separating face exposed by the sawing. The over-dimension in this region is substantially removed by the sawing. Thereafter it is necessary to mechanically work the separating faces of each pair of adjacent individual parts. This step may have to be followed by working of the separating faces to obtain a precise fit between the components, for example by grinding.

Because of the over-dimensioning in the region of the separating plane, this method requires the use of material which will later be removed during the sawing. The sawing work and the further mechanical finishing work, quite possibly necessitating grinding, involve a considerable amount of time and expenditure. Since the possibility of insufficient mechanical working of some of the finished articles cannot be completely excluded, some rejects may occur. All these drawbacks are particularly grave if mass production is involved.

SUMMARY OF THE INVENTION

It is an object of the invention to overcome the above-described drawbacks, to considerably simplify the above-mentioned method and simultaneously to permit production of individual parts which are to be assembled together having a precise fit.

This is accomplished by the method according to the invention of producing powder forged components which precisely fit together, including the steps of:

forming a one-piece preform by pressing from powder;

forming at least one tear notch in the preform at a selected location;

sintering the preform;

providing a protective layer on each tear notch; forging the preform into a component, including closing each tear notch during the forging to form a corresponding slit;

cooling the component; and separating the component at the corresponding selected location into a plurality of individual parts by breaking.

In the method according to the invention, the preform has a larger thickness dimension than the component. The component is obtained during forging. During forging, the tear notch of the preform is deformed into a slit-like configuration having two facing interior surfaces and appears to be more or less closed. Consequently, at the facing interior surfaces of the slit are two, preferably thin, protective layers, particularly oxide layers, which come to lie adjacent to one another. When separation of the component is made to occur, it is initiated by formation of a crack emanating from the tear notch. The crack produced in this way can be predetermined in its length as well as in its width by the configuration of the tear notch. After cooling, the component is separated into individual parts by breaking the component at the location of each tear notch.

The solution of the problem to be solved according to the invention can be improved in that additionally at least on crack path notch is provided in the region of the desired separating surface and at a distance from the tear notch. With considerable likelihood the existing crack, after cooling, will cause the component to break apart into its individual parts along this crack and in a continuation of this crack. However, to ensure that this occurs with even greater reliability, the invention provides that, in addition to the tear notch, at least one crack path notch is provided at the point of separation between two individual parts in the region of the desired separating face, at a distance from the tear notch. This further notch causes the separation to extend from the point of separation in the separating face, so to speak, from one notch to the other.

In this way, the location of the separating face can be determined unequivocally. The path of the crack during the separation and thus the direction of its spreading can thus be predetermined by the arrangement of the crack path notch. Moreover, less work is required for the separation and the probability that deformations occur in the separating faces during the separating process is reduced.

In such a breaking or separation of the component, no material is consumed by mechanical working. Each of the resulting parts has a separating face, exposed by the formation of the crack, which requires no working since each separating face has a precise mating fit with the corresponding face of another one of the resulting parts. Two individual parts which were originally adjacent prior to breaking of the component can therefore be readily joined together again in mating engagement at their separating faces.

Compared to the mechanically worked separating faces o the prior art, the separating faces produced according to the invention have a significant advantage in that their contacting surface area is substantially larger. This permits the assembled component to withstand greater stress. Another advantage of the invention is the saving of time and costs as compared with the prior art, since the separation by breaking can be performed with substantially simpler means than the prior art separation process which must be followed by mechanical working.

According to the invention the method can be performed in such a way that the preform is provided with at least one tear notch and at least on crack path notch during a pressing step using a pressing tool. A suitable mold, for example, may be provided in t he pressing tool for this purpose. As a further feature of the invention, the preform may also be provided with at least one tear notch and at least one crack path notch by mechanical working. This is possible, for example, by milling or push-cutting the preform after the pressing step. Depending upon the type of component to be produced, one or a plurality of tear and crack path notches are applied at locations suitable for separation.

Additionally, the invention relates to a method of producing a connecting rod having a divided connecting rod head and a connecting rod eye. After fabrication, the connecting rod is composed of two individual parts, namely a bearing cap portion and a main rod portion.

In a further feature of the invention, the separating step may be followed by subsequent machining of the connecting rod, particularly of a bearing formed in the connecting rod head and a bearing connecting rod eye.

According to a preferred feature of the invention, the crack path notches are formed during the production of the holes for the connecting rod screws in the walls of the holes in the separating plane of a connecting rod head portion of the component. In particular, the crack path notches may be produced in the form of an annular groove either during the time the holes for the connecting rod screws are drilled or subsequent to this drilling. It is also possible to provide for the production of the crack path notches simultaneously or after cutting of the threads for the connecting rod screws.

Additionally, according to another preferred feature of the invention, the desired separating face can be cooled at least partially before the separating process by subjecting the exterior faces of the component at the desired separating face to a flowable coolant. In particular, the desired separating face may be cooled with a liquid gas, preferably nitrogen. This can be effected by spraying the exterior faces of the component in the vicinity of the separating face with rows of sprayed coolant or by otherwise supplying the coolant in a finely dosaged manner.

Independently of whether the separating step is accompanied by cooling, the separation according to the invention may also be accomplished by use of a separating device introduced into the holes which receive the connecting rod screws. Instead of the introduction of a separating tool into the connecting rod head portion, the separation is preferably initiated from the two holes which receive the connecting rod screws. To accomplish this, different separating devices can be employed which are arranged in the holes in a suitable manner and/or are fastened there. This measure also results in reducing the danger of deformation of the separating face during the separation process. The accuracy of the fit of the separating faces is thereby retained even better, so that the subsequent assembly of the individual parts at their separating faces is possible in the same manner as before.

The invention will now be described in greater detail with reference to an embodiment that is illustrated in the drawings.

BRIEF DESCRIPTION OF THE DRAWINGS

FIG. 1 is a schematic front elevational view of preform used for making a connecting rod according to the invention.

FIG. 1A is an enlarged view of a circled portion labelled "A" in FIG. 1.

FIG. 2 is a front elevational view of a component formed from the preform of FIG. 1.

FIG. 2A is an enlarged view of a circled portion labelled "B" in FIG. 2.

FIG. 3 is a front elevational view, partially broken away and partially in section, of an assembled component formed from individual parts.

FIG. 3A is an enlarged view of a circled portion labelled "C" in FIG. 3.

DETAILED DESCRIPTION OF THE PREFERRED EMBODIMENT

Figure 4:
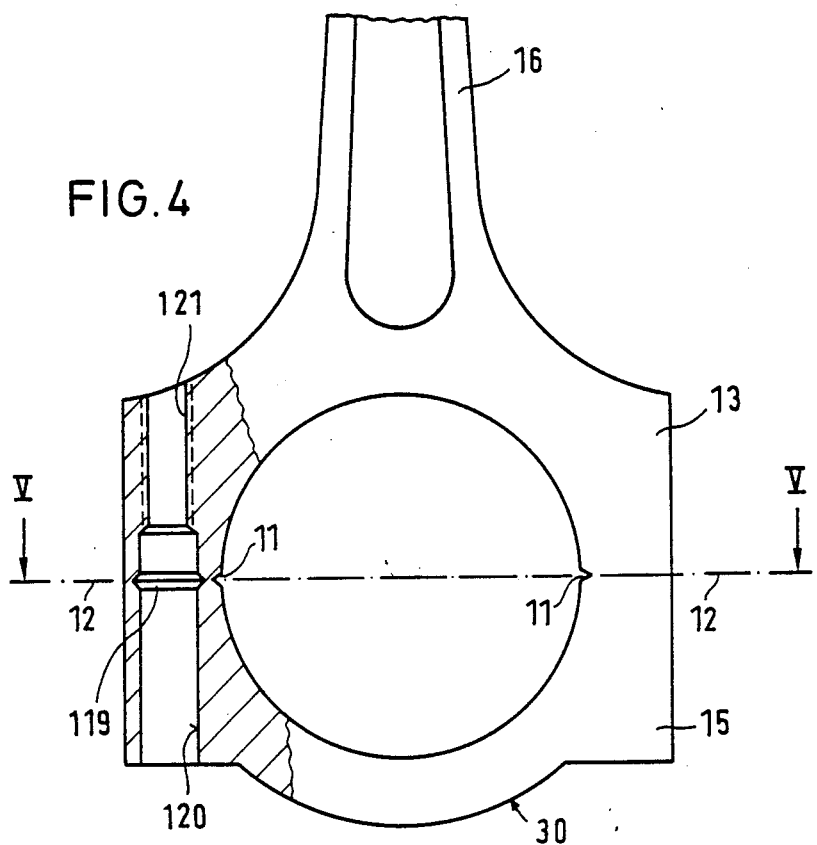
FIG. 4 is a top elevational view, shown partially in section, of the component of FIG. 2.

FIG. 1 shows a preform 10 composed of a powdered metal alloy that has a schematically indicated separating plane 12 where a separating face is to be formed in the face of the preform 10, as well as two tear notches 11 which have been made along the path of the separating plane 12. The preform 10 has a shape which is generally that of a connecting rod having a connecting rod eye portion 18 and a connecting rod head portion 13. The preform 10 has a required excess thickness as compared to a component 20 having a final component form as shown in FIG. 2, however this excess thickness is not shown in FIG. 1.

Various powdered metal alloys can be used in the preform 10. In one example, a finish alloyed iron powder, composed of approximately 0.1 to 0.5% Mn, 0.1 to 0.5% Mo, 0.2 to 2.2% Ni and 0.3 to 1.0% C is pressed. The preform 10 is produced to have a ±0.6% weight tolerance. A pair of tear notches 11 are applied at the location of a desired separating plane 12 between a bearing cap portion 15 and a main rod portion 13. A material density for the preform 10 of about 6.0 to 7.0 g/cm$^3$ is realized. After pressing, the section weights of a connecting rod head portion 13 and a connecting rod eye portion 18, as well as the weight of the connecting rod preform 10 as a whole, are checked.

The preform 10 of the connecting rod is then sintered briefly in a sintering-forging furnace. This furnace includes a zone for burning away a sliding or release agent and a further zone for sintering, but does not include a zone for cooling. In the furnace, the preform is heated, within a period of about half an hour, to a sintering temperature in a range of 800° to 1200 ° C. in a protective gas atmosphere. The sintered preform 10 is removed directly which at the sintering temperature and is then hot compacted in a closed tool. While during pressing, the preform 10 already has the dimensions of the connecting rod with an excess thickness as discussed hereinabove, the preform is further compacted during forging to the final component form of the component 20 shown in FIG. 2. The two tear notches 11, made in the preform 10 along the separating plane 12 between a bearing cap portion 15 and the connecting rod portion 13, are closed during forging so as to form respective slit-like cracks, shown in FIG. 2A. This results in a very strong component composition having a material density which is greater than 7.6 g/cm$^3$.

However, as a further feature of the invention, the preform 10 may also be provided with a notch 11 by mechanical working before forging. This is possible, for example, by milling or push-cutting the preform 10. Depending on the type of finished component to be produced, one or more tear notches 11 are applied at locations suitable for subsequently initiating separation therealong, for example along the line of a groove formed in the surface of the preform.

Advantageously, the preform is weighed before sintering. This is necessary if given tolerances must be maintained for the weight of the preform and of the sections formed therefrom.

A sliding agent added to the powder may subsequently be burnt away. The sintering step in this case should take place under a protective gas atmosphere.

Preferably the protective layer is applied to the notch after sintering by exposure of the tear-notched preform to atmospheric air as it is brought to a forge. This exposure takes a relatively short time which is, however, sufficient to permit a thin oxide layer to be formed. The component hardly cools during this relatively short time so that, as a further feature of the invention, it is possible to forge the preform at approximately the sintering temperature.

During forging, the tear notch is then preferably closed so that it then no longer has a notch shape and instead is caused to have the shape of a crack defined in length and position during forging. As described above, the slit 14 has a pair of facing surfaces which each have a protective layer, and in particular this protective layer is an oxide layer. The two facing protective layers are in facing engagement with each other along each slit 14, and maintain separation between the facing surfaces underlying the respective protective layers along each slit 14.

The forging step may be followed by a cooling step, in which the component 20 can be cooled by air, oil or a protective gas.

According to a preferred feature of the invention, it is not the temperature of the component as a whole that is kept lower than room temperature during the separation process; instead, the component is merely at least partially cooled at the desired separating face before the separation occurs. This requires considerably less expenditures for cooling than if the entire component were to be cooled. And no undesirable condensation moisture develops in this case.

The partial cooling in the region of the desired separating face has the result that the notched bar impact strength at this location is reduced so that less deformation work must be applied. Since metal components have a relatively high thermal conductivity, cooling occurs quickly in the desired regions. This avoids breaks due to deformation and permits the occurrence of brittle fractures.

A breaking or separating step is used to break the component 20 into a plurality of individual parts, each individual part having a separating face produced between each two facing portions along each slit 14. For this purpose, tensile force, pressure, and/or bending stresses may be applied to the component 20 in a suitable manner to cause the breaking.

The temperature of the component 20 during the separating step is kept lower than room temperature or at most equal to room temperature, to improve separation of the component 20 into individual parts and to reduce the possibility of yielding fractures which would result in deformation of the component 20 prior to separation into the individual parts. At lower temperatures, the component 20 becomes more brittle and therefore has a favorable breaking behavior. Favorable breaking behavior of the component may also be realized if, during the breaking step, the separation of the component 20 is effected at a relatively high speed.

FIG. 2 shows a connecting rod 20 having a connecting rod head portion 13 which has a bearing cap portion 15. After fabrication, the connecting rod 30 is composed of two individual parts, as shown in FIG. 3 namely the bearing cap portion 15 and a main rod portion 13. Once the component 20 has been cooled, holes are formed in the connecting rod head portion 13 of the component 30 for receiving a plurality of connecting rod screws 17. The connecting rod screws 17 are then placed in the formed holes and connecting rod nuts (not shown) are assembled loosely on the connecting rods screws 17. Separating faces are then produced at the separating plane 12 of the connecting rod head portion 13 by breaking. The loose assembly of the connecting rod screws 17 and the nuts must be sized such that sufficient play exists to permit separation of the individual parts from one another upon separation of the component 20. The use of this loose assembly prior to the breaking step has the advantage that the broken individual parts remain associated with one another after separation of the component 20 occurs. This prevents a mixup, during breaking of a plurality of such components 20, of ones of the bearing cap portions 15 with noncorresponding ones of the main rod portions 16. When each component 20 is assembled, it becomes a connecting rod 30 having a connecting rod head bearing 19 and a connecting rod eye bearing 21.

The separation of the individual parts from the original component may be effected by introduction of a separating tool (not shown) into the opening of the connecting rod head bearing 19. This separating tool may be, for example, a spreader, a wedge or the like.

The separating step may be followed by subsequent machining of the connecting rod 30, particularly of the bearing 19 of the connecting rod head portion 13 and the connecting rod eye bearing 21. The connecting rod screws 17 and the corresponding nuts thereon may require tightening before the connecting rod head portion 13 is machined.

In FIG. 2, the bearing cap portion 15 and the main rod portion 16 are shown as separated individual parts formed from the component 20 of FIG. IA, and which are relatively loosely connected with one another by pair of the connecting rod screws 17 and corresponding pair of the connecting rod nuts (not shown). For further machining of the connecting rod head portion 13, the bearing cap portion 15 and the main rod portion 16 of the connecting rod 30 are tightly connected by means of the connecting rod screws 17 and the corresponding connecting rod nuts. The further machining of a connecting rod eye portion 18 is preferably effected simultaneously with that of the connecting rod head portion 13 and the bearing cap portion 15.

Figure 5:
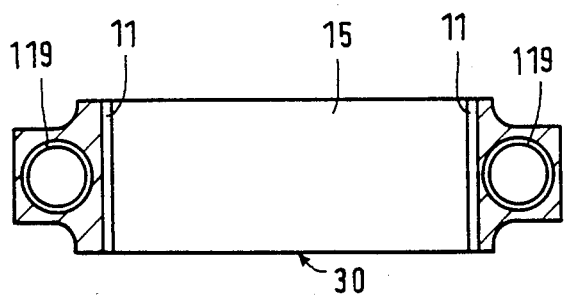
FIG. 5 is a sectional view taken along line V—V of FIG. 4.

In FIGS. 4 and 5, two crack path notches 119 have been formed in the separating plane 12 in addition to the two tear notches 11 and are disposed between the bearing cap portion 15 and the main rod portion 16, as shown in FIG. 2. The crack path notches 119 are formed during the production of each of the holes 120 for receiving the connecting rod screws 17 which are shown in FIG. 3. Each of the crack path notches 119 are here provided in the form of an annular groove. However, each crack path notch 119 may also be formed during or after the cutting of a thread 121 for receiving the connecting rod screws 17.

Figure 6:
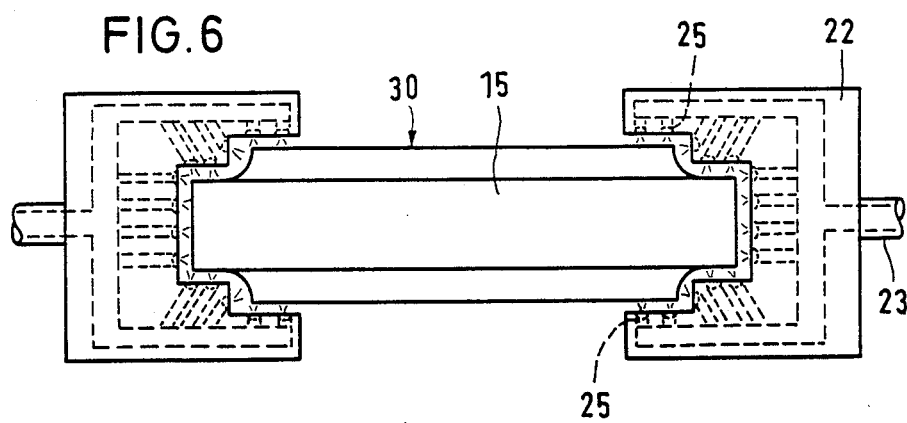
FIG. 6 is an end elevational view of a cooling apparatus positioned about the component of FIG. 2.
Figure 7:
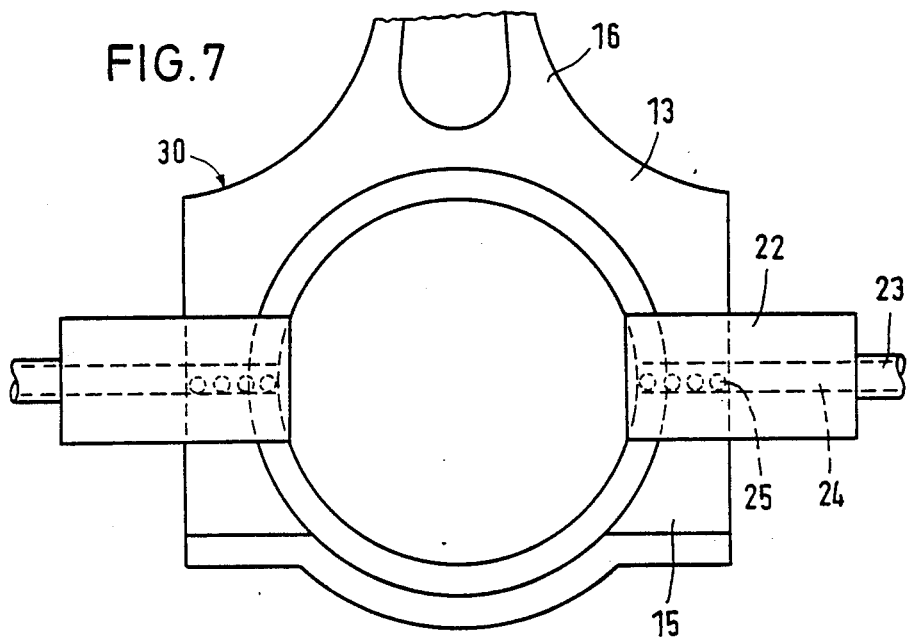
FIG. 7 is a top elevational view of the cooling apparatus of FIG. 6 positioned about the component.

The connecting rod head portion 13 shown in FIG. 6 includes a bearing cap portion 15 which is surrounded by a cooling device 22, as shown in FIGS. 6 and 7. This cooling device 22 includes an inlet 23 for receiving the coolant. The inlet 23 communicates with a channel 24 (shown in dashed lines in FIGS. 6 and 7) which in turn communicates with a plurality of spray nozzles 25 (shown in dashed outline) to spray the fluid onto the component 20.

The preform 10 comprises excess material in its thickness as compared to its final shape. This is arrived at by forging during which the incipient notches in the preform are completely closed and therefore no longer exist in their original form. The original form of the tear notches 11 may be for example rounded or sharp. No specific portion of the preform 10 must be deformed to change the rounded or sharp notches 11 into the slits 14. Whereas, during pressing, the measurements of the preform 10 are those of the connecting rod plus excess thickness, during forging it is compacted to its final shape. The original density of about 6.0 to 7.0 g/cm$^3$ results during forging in a material density in excess of 7.6 g/cm$^3$.

The present disclosure relates to the subject matter disclosed in German Application No. P 38 06 236.4 of Feb. 27th, 1988, and German Application No. P 39 01 019.8 of Jan. 14th, 1989, the entire specification of both of which are incorporated herein by reference.

It will be understood that the above description of the present invention is susceptible to various modifications, changes and adaptations, and the same are intended to be comprehended within the meaning and range of equivalents of the appended claims.

What is claimed is:

1. A method of producing powder forged components having parts which precisely fit together, comprising the steps of:
    forming a one-piece preform by pressing from powder;
    forming at least one tear notch in said preform at a corresponding selected location;
    sintering said preform;
    providing a protective layer on said at least one tear notch;
    forging said preform into a component, including closing each said tear notch during said forging to form a corresponding slit;
    cooling said component; and
    separating said component at said corresponding selected location into a plurality of individual parts by breaking.

2. Method according to claim 1, wherein, after said step of forming at least one tear notch, further comprising the step of providing at least one crack path notch at a selected distance from said tear notch in a predetermined region to facilitate propagation of a separating face through said predetermined region during s id step of separating said component.

3. A method according to claim 1, wherein at least one crack path notch and said at least one tear notch are provided in said preform during said pressing step.

4. A method according to claim 1, wherein at least one crack path notch and said at least one tear notch are provided in said preform by mechanical working.

5. A method according to claim 1, further comprising the step of weighing said preform before performing of said sintering step.

6. A method according to claim 1, wherein said preform includes a sliding agent, and further comprising the step of burning away said sliding agent; and wherein said sintering step occurs in a protective gas atmosphere.

7. A method according to claim 1, further comprising the step of providing a protective layer on said preform during said step of providing a protective layer on said at least one tear notch, said protective layer being an oxide layer.

8. A method according to claim 1, wherein said tear notch is closed during said forging step; and wherein during said step of separating said component, a crack of predetermined length and position is produced starting at said corresponding selected location of each said at least one tear notch and along portion of said protective layer adjacent said corresponding selected location.

9. A method according to claim 1, wherein during said forging step, said preform is forged at approximately a same temperature at which said sintering was performed.

10. A method according to claim 1, wherein during said step of cooling said component, cooling is performed by air, oil or protective gas.

11. A method according to claim 1, wherein during said step of separating said component, a crack is produced which creates separating faces on each of two adjacent individual parts so formed from said component.

12. A method according to claim 1, wherein during said step of separating said component, the temperature of said component is at most equal to room temperature.

13. Method according to claim 1, wherein in said cooling step, at least partially cooling said predetermined region before performing said step of separating said component.

14. Method according to claim 13, wherein in said cooling step, applying a flowable coolant to an exterior surface of said component at said predetermined region.

15. Method according to claim 14, wherein in said cooling step, employing as a coolant a liquefied gas.

16. A method according to claim 1, wherein said separating step takes place at high speed.

17. A method according to claim 1, wherein in said forging step, forging said component into a connecting rod having a connecting rod head portion, and after said cooling step, providing a plurality of holes in said connecting rod head portion.

18. Method according to claim 17, further comprising the step of forming a crack path notch in the wall of each of said holes for receiving connecting rod screws in said connecting rod head portion after said step of producing said holes.

19. Method according to claim 18, wherein in said step of forming the crack path notches, forming each of said crack path notches in the form of an annular groove.

20. Method according to claim 18, wherein after said step of producing said holes, cutting threads along said holes for receiving connecting rod screws prior to or simultaneously with said step of producing said crack path notches.

21. Method according to claim 17, further comprising the step of providing a plurality of connecting rod screws corresponding to the number of holes for receiving connecting rod screws, inserting said connecting rod screws into respective ones of said holes, providing a plurality of connecting rod nuts, loosely mounting said plurality of connecting rod nuts on respective ones of said plurality of connecting rod screws.

22. A method according to claim 21, wherein, prior to said step of separating said connecting rod head portion, further comprising the step of introducing a separating tool into a portion of said connecting rod head portion.

23. Method according to claim 18, wherein, prior to said step of separating said connecting rod head portion, further comprising the step of introducing a separating tool into said holes.

24. A method according to claim 17, wherein in said forging step including forging said component into a connecting rod having a connecting rod head portion, providing a connecting rod eye portion in said connecting rod and providing a bearing portion in said connecting rod head portion; and after said step of separating said component, further comprising the steps of machining said connecting rod head portion and machining said connecting rod eye portion.

25. A method according to claim 24, further comprising the step of forming a crack path notch in the wall of each of said holes for receiving connecting rod screws in said connecting rod head portion after said step of producing said holes;

after said step of producing said holes, cutting threads along said holes for receiving connecting rod screws prior to or simultaneously with said step of producing said crack path notches;

before said step of separating said component, providing connecting rod nuts on said connecting rod screws; and before said steps of machining said connecting rod head portion and machining said connecting rod eye portion, further comprising the step of tightening said connecting rod screws and connecting rod nuts to tightly secure said individual parts of said component.

26. A method of producing a connecting rod from powder forged components having parts which precisely fit together, comprising the steps of:

forming a one-piece preform by pressing from powder;

forming at least one notch in said preform at a corresponding selected location;

sintering said preform;

providing a protective layer on said at least one notch;

forging said preform into a connecting rod having a connecting rod eye portion and a connecting rod head portion having an opening defining a bearing surface, and closing each said notch during said forging to form a corresponding slit; at least one said notch being disposed at said connecting rod head portion;

cooling said connecting rod;

producing holes in said connecting rod head portion, each hole passing through a bearing cap portion and a main rod portion of said connecting rod head portion, providing a plurality of connecting rod screws and a corresponding plurality of connecting rod nuts, and loosely mounting said connecting rod screws and corresponding ones of said connecting rod nuts in corresponding ones of said holes;

separating said connecting rod head portion into a bearing cap portion and a main rod portion by breaking, such that, upon completion of said step of separating said connecting rod, said bearing cap portion and said main rod portion are retained together by said plurality of connecting rod screws and said corresponding plurality of connecting rod nuts.

27. A method according to claim 26, wherein in said step of producing holes in said connecting rod head portion, producing said holes so that each hole passes through a bearing cap portion and a main rod portion of said connecting rod head portion.

28. A method according to claim 27, wherein after said step of producing holes in said connecting rod head portion, providing a plurality of connecting rod screws and a corresponding plurality of connecting rod nuts, and loosely mounting said connecting rod screws and corresponding ones of said connecting rod nuts in corresponding ones of said holes;

separating said connecting rod head portion into a bearing cap portion and a main rod portion by breaking, such that, upon completion of said step of separating said connecting rod, said bearing cap portion and said main rod portion are retained together by said plurality of connecting rod screws and said corresponding plurality of connecting rod nuts.

* * * * *